Sept. 1, 1953  I. SINGER  2,650,365
FLAME- AND HEAT-RESISTANT WORK GLOVE
Filed July 5, 1951

INVENTOR.
Isadore Singer,
BY
Cromwell, Greist & Warden
Attys.

Patented Sept. 1, 1953

2,650,365

UNITED STATES PATENT OFFICE 2,650,365

FLAME- AND HEAT-RESISTANT WORK GLOVE

Isadore Singer, Chicago, Ill.

Application July 5, 1951, Serial No. 235,253

3 Claims. (Cl. 2—167)

The present invention pertains to an improved protective work glove for the use of foundry men, furnace men, firemen, and others whose duties involve the handling of hot objects or direct exposure to flame or a high degree of heat.

It is an object of the invention to provide an improved insulating and flame-proof work glove for the foregoing purposes which is fabricated of multiple plies of pre-treated fibrous materials associated with one another in an improved fashion to constitute a heat- and flame-resistant laminated fabric which, when converted into a workman's glove of appropriate outline, affords complete protection for the wearer's hands against direct exposure or contact with heat, radiant or otherwise.

A more specific object is to provide an improved work glove material which is rendered flame-proof and heat-resistant due to its construction from an outer, wear-resistant layer of a rough, shaggy fabric such as terrycloth or its equivalent, this layer being pre-treated with a special flame-proofing material, an inner, loosely matted layer of fibrous material such as asbestos wool or its equivalent, providing considerable air space in proportion to the total space occupied by the layer, and an inner hand contacting layer of relatively soft, smooth texture.

Yet another specific object is to provide an improved work glove and material therefor constituted of laminated layers as set forth in the preceding paragraph, in which those layers are firmly stitched in a predetermined manner into a unitary sheet, thereby holding the various materials in predetermined relation and preserving desirable insulating qualities thereof, attributable to the large volume of air space present therein and to the inherent insulating characteristics of the materials of the layers.

The foregoing statements are indicative in a general way of the nature of the invention. Other and more specific objects will be apparent to those skilled in the art upon a full understanding of the construction of the glove and the material of which it is made.

A single embodiment of the invention is presented herein for purpose of illustration and it will be appreciated that the invention may be incorporated in other modified forms coming equally within the scope of the appended claims.

Figure 1:
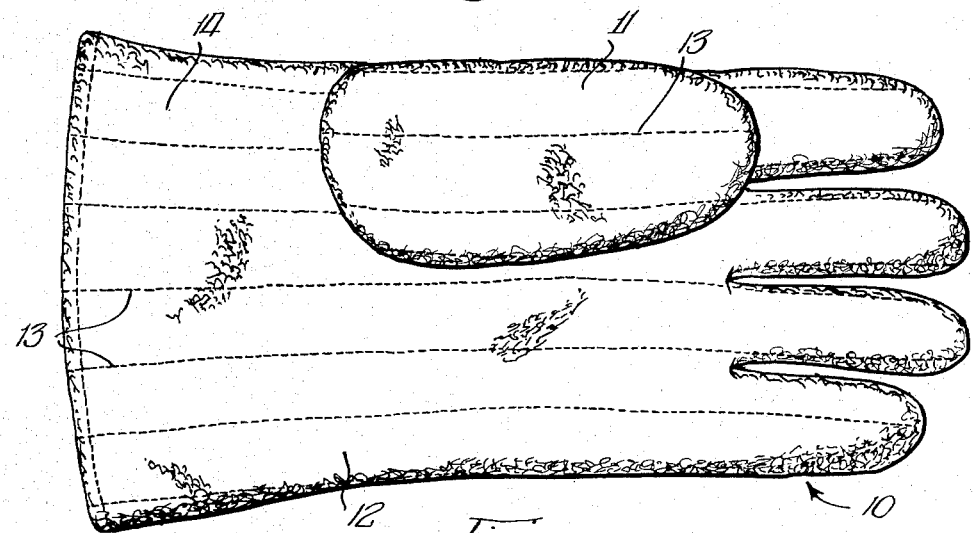
Fig. 1 is a plan view illustrating a work glove of conventional outline which is constructed of the improved laminated and stitched, flame- and heat-proof fabric according to the invention.

The improved flame- and heat-resistant work glove of the invention is generally designated by the reference numeral 10. Its shape and general manner of assembly of the thumb and hand portion 11, 12 respectively are entirely conventional, other than in the mode of stitching, as indicated at 13, the several layers of the fabric or fibrous material of which the glove is manufactured. It is of relatively loose fitting shape and has a relatively large protective cuff area.

Figure 2:
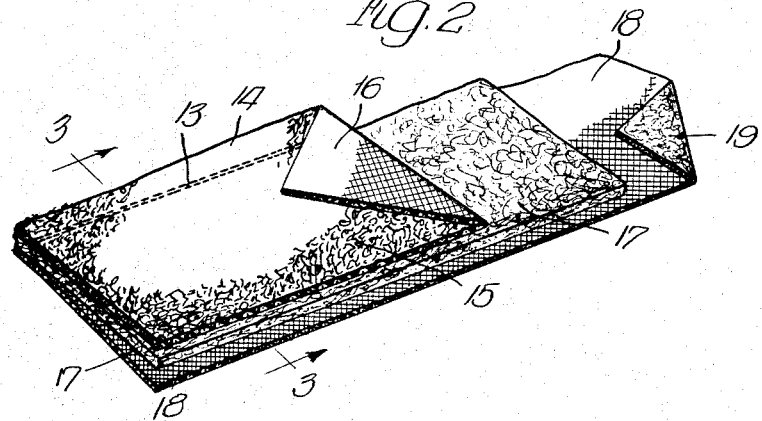
Fig. 2 is a fragmentary perspective view illustrating the physical properties and the relationship to one another of the various layers of the fabric.
Figure 3:
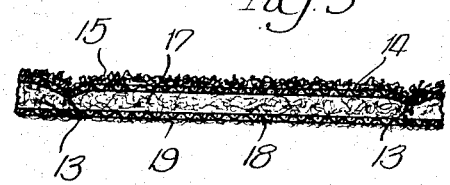
Fig. 3 is a fragmentary view in cross section through the laminated material shown in Fig. 2, on a line corresponding to line 3—3 of that figure.

The laminated character of the material is illustrated in Figs. 2 and 3 of the drawings. It comprises an outer, wear-resistant layer which presents a rough, relatively coarse and shaggy surface, yet is nevertheless of sufficiently dense or closely matted texture character to have good wear-resisting qualities. In the specimen chosen for purpose of illustration, this layer 14 is constituted by a knitted fabric having the general appearance and attributes of terrycloth, a well known type of woven material. Its outer surface 15 is of the shaggy matted nature described above, and its inner surface 16 has a relatively smooth, knitted texture. Outer layer 14 is impregnated with a suitable flame-proofing composition, such as a neutral ammonium phosphate of which several are available on the market, the impregnant being dried and affording permanent protection thereafter, rather than being of vaporizable character. Layer 14 is thus rendered extremely resistant to direct flame and also has considerable insulating value. Moreover, the impregnation of layer 14 imparts an added degree of stiffness or body thereto which contributes better wear resistance.

The intermediate layer of the multi-ply material, generally designated by the reference numeral 17, is constituted by a loosely assembled layer or bat of heat- and flame-resistant fibers or filaments, preferably relatively short and arranged in a relatively fluffy, non-compacted consistency. I find that a mixture of asbestos and wool fibers is well suited for use in layer 17 due to the relatively non-inflammable character thereof, as well as to the large volume of air space, and resultant insulating capacity, represented by the loosely matted texture. Other materials such as all asbestos fibers, rock wool, glass wool, etc., will suggest themselves to those skilled in the art.

Finally, the inner layer 18 of the material is preferably one which presents an exposed inner surface 19 of a relatively soft, woven or knitted, flannel-like or fleecy texture, comfortable to the hand of the user yet having adequate wearing quality. The opposite surface of the layer 18 has a typical smooth knitted texture and appearance. Thus the relatively smooth and densely woven or knitted surfaces of the layers 14 and 18, which immediately encase the intermediate, loosely assembled layer 17 of insulating and flame-resistant fiber, do so while restraining those fibers from escaping through the interstices of the respective layers 14, 18.

The laminated heat- and flame-proof fabric is completed by lines of stitching 13, which in the illustrated example, extend longitudinally in well spaced lateral relation to one another. They are relatively widely spaced in the interest of avoiding excessive matting of intermediate layer 17, and thereby preserving substantial air space between the outer and inner surfaces of the built up material. The stitching prevents shifting and resultant localized thinness of the intermediate fibers 17, so that the insulating properties of the material are uniform throughout. Stitching 13 also imparts desirable added stiffness or body to the composite multi-ply material and the glove constructed thereof.

A work glove of the foregoing description is inexpensively manufactured and sold at low cost. It may be produced in any desired design, it has good wearing qualities, is comfortable, and is highly effective in protecting the hand of the wearer against radiant heat, as in the firing and use of electric and other furnaces, and direct contact heat, as in the handling of hot articles in many industries.

I claim:

1. A work glove to protect against high temperatures, in which a surface exposed to the high temperature is constructed of a laminated heat- and flame-resistant fabric, said fabric comprising a first layer of material having an outer surface, constituting the temperature-exposed surface of the glove, which is of relatively dense and rough, shaggy texture, which material is impregnated with a dry, substantially non-vaporizable flame-proofing compound, an intermediate layer of loosely assembled, heat-resistant fibers, and a third layer having a texture comfortable to the touch, said layers being assembled in superposed relation in the order mentioned and secured together by lines of stitching extending through all three layers, said lines of stitching being spaced from one another sufficiently to preserve a loosely assembled, relatively fluffy relationship of said intermediate fibers yet to prevent substantial bodily displacement of said fibers between said first and third layers.

2. A work glove to protect against high temperatures, in which a surface exposed to the high temperature is constructed of a laminated heat- and flame-resistant fabric, said fabric comprising a first layer of material having an outer surface, constituting the temperature-exposed surface of the glove, which is of relatively dense and rough, shaggy texture comparable to terrycloth which material is impregnated with a dry, substantially non-vaporizable flame-proofing compound, an intermediate layer of loosely assembled, heat-resistant asbestos fibers, and a third layer having a soft, flannel-like texture comfortable to the touch, said layers being assembled in superposed relation in the order mentioned and secured together by stitching extending through all three layers, said lines of stitching being spaced from one another sufficiently to preserve a loosely assembled, relatively fluffy relationship of said intermediate fibers yet to prevent substantial bodily displacement of said fibers between said first and third layers.

3. A work glove to protect against high temperatures, in which a surface exposed to the high temperature is constructed of a laminated heat- and flame-resistant fabric, said fabric comprising a first layer of material having an outer surface of relatively dense and rough, shaggy texture, which surface constitutes the temperature-exposed surface of the glove, and an inner, relatively smooth, close-knit surface, which material is impregnated with a dry, substantially non-vaporizable flame-proofing substance, an intermediate layer of loosely assembled, heat-resistant fibers and a third layer having a relatively smooth, close-knit surface on one side thereof and a soft, flannel-like texture on the other side thereof, said layers being assembled in superposed relation in the order mentioned, with the smooth, close-knit surfaces of said first and third layers in contact with said intermediate layer, and being secured together by lines of stitching, which lines are in substantially spaced relation to one another to preserve substantial body of air space in the assembled material and to prevent substantial bodily displacement of said fibers between said first and third layers.

ISADORE SINGER.

References Cited in the file of this patent

UNITED STATES PATENTS

| Number | Name | Date |
|---|---|---|
| 1,730,763 | Gerding | Oct. 8, 1929 |
| 2,164,499 | Coughlin | July 4, 1939 |
| 2,437,974 | Schwartz | Mar. 16, 1948 |
| 2,578,188 | Ionides et al. | Dec. 11, 1951 |